United States Patent [19]
Packer

[11] Patent Number: 6,018,516
[45] Date of Patent: Jan. 25, 2000

[54] METHOD FOR MINIMIZING UNNEEDED RETRANSMISSION OF PACKETS IN A PACKET COMMUNICATION ENVIRONMENT SUPPORTING A PLURALITY OF DATA LINK RATES

[75] Inventor: Robert L. Packer, Los Gatos, Calif.

[73] Assignee: Packeteer, Inc., Cupertino, Calif.

[21] Appl. No.: 08/970,693

[22] Filed: Nov. 14, 1997

[51] Int. Cl.⁷ .................................................. G06F 11/00
[52] U.S. Cl. ........................ 370/231; 370/236; 370/428; 370/522; 714/748; 714/749
[58] Field of Search .................................. 370/230, 253, 370/252, 400, 410, 428, 522, 231, 235, 236, 238; 714/748, 749, 18

[56] References Cited

U.S. PATENT DOCUMENTS

| | | | |
|---|---|---|---|
| 4,882,765 | 11/1989 | Maxwell et al. | 370/315 |
| 4,896,151 | 1/1990 | Kuranami et al. | 714/748 |
| 5,130,978 | 7/1992 | Mobasser | 370/391 |
| 5,224,105 | 6/1993 | Highley | 714/749 |
| 5,432,798 | 7/1995 | Blair | 714/748 |
| 5,440,551 | 8/1995 | Suzuki | 370/395 |
| 5,610,595 | 3/1997 | Garrabrant et al. | 370/394 |
| 5,745,685 | 4/1998 | Kirchner et al. | 714/748 |
| 5,793,768 | 8/1998 | Keshav | 370/400 |
| 5,802,106 | 9/1998 | Packer | 375/225 |

OTHER PUBLICATIONS

W. Richard Stevens, "TCP Timeout and Retransmission," TCP/IP Illustrated, vol. 2, pp. 297–306 (1994).

Vern Paxson, "End–to–End Internet Packet Dynamics," Network Research Group, Lawrence Berkeley National Laboratory, University of California, Berkeley, Jun. 23, 1997.

Robert L. Packer, "Method for Explicit Data Rtae Control in a Packet Communication Environment Without Data Rate Supervision", filed Nov. 1, 1996, U.S. patent Application 08/742,994.

*Primary Examiner*—Douglas W. Olms
*Assistant Examiner*—Seema S. Rao
*Attorney, Agent, or Firm*—Townsend and Townsend and Crew LLP; Kenneth R. Allen

[57] ABSTRACT

A method is provided for preventing gratuitous retransmission of data from being propagated through a network which includes holding data to be retransmitted for a minimum time period. If an acknowledgment occurs while the retransmitted data is still being held, then the retransmitted data is discarded rather than propagated through the network. The invention also provides for selectively holding retransmissions based upon ascertainable factors about the underlying connection activity, such as number of successful transmissions.

10 Claims, 7 Drawing Sheets

FIG. 2B
(STEP 204 OF FIG. 2A)

FIG. 2C
(STEP 208 OF FIG. 2A)

FIG. 2D
(STEP 212 OF FIG. 2A)

FIG. 3
(PRIOR ART)

METHOD FOR MINIMIZING UNNEEDED RETRANSMISSION OF PACKETS IN A PACKET COMMUNICATION ENVIRONMENT SUPPORTING A PLURALITY OF DATA LINK RATES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATIONS

This application makes reference to the following commonly owned U.S. Patent Applications, which are incorporated herein in their entirety for all purposes:

Copending U.S. patent application Ser. No. 08/742,994, now pending, in the name of Robert L. Packer, entitled "Method for Explicit Data Rate Control in a Packet Communication Environment Without a Data Rate Supervision," relates to a technique for automatically scheduling TCP packets for transmission; and, Copending U.S. patent application Ser. No. 08/762,828, now U.S. Pat. No. 5,802,106, in the name of Robert L. Packer, entitled "Method for Rapid Data Rate Detection in a Packet Communication Environment Without Data Rate Supervision," relates to a technique for automatically determining the data rate of a TCP connection.

BACKGROUND OF THE INVENTION

This invention relates to digital packet telecommunications, and more specifically to methods for minimizing retransmissions based upon automatically determined characteristics of the underlying network connection.

The TCP/IP protocol suite is employed in the Internet, a world-wide data communication network environment, and is also employed in local networks called Intranets. TCP technology intentionally omits explicit supervisory function over the rate of data transport over the various media comprising the network. While there are certain perceived advantages, this characteristic has the consequence of juxtaposing very high-speed packets and very low-speed packets in potential conflict, which results in inefficiencies. Resulting problems of latency and bandwidth constraints manifest themselves in delay, lost information and unsatisfied users.

The Transmission Control Protocol (TCP) provides a reliable session-based service for delivery of sequenced packets of information across the Internet. One method employed to provide reliability is to expect each end to acknowledge the data received from the other end. However, data segments and acknowledgments can be lost. To solve this problem, TCP sets a time-out when it sends data, so that the data unacknowledged is retransmitted. The TCP protocol must therefore manage a retransmission timer for each connection. The retransmission timer is used whenever TCP expects an acknowledgment from the other side. Upon transmitting some data, TCP tracks a retransmission time-out (RTO) value and a round trip time (RTT) for the given connection. If an acknowledgment is not received by the time the RTO expires, TCP retransmits the data using an exponentially increasing value for the RTO. This doubling is called an "exponential back-off." The RTO is computed as a linear function of the RTT, which is continuously tracked by TCP for each connection. Its value changes over time with changes in routing and network traffic load.

Implementations of TCP may have either hard coded values for the initial minimum RTO and initial RTO values for each connection, or alternatively, a single set of RTO parameters to be applied to all connections. However, operating system configurations may be unable to provide reasonable RTO related parameters for individual connections due to disparities in speed among connections.

For example, the default setting for RTT in the Solaris version 2.5 operating system is 500 milliseconds, and the default minimum RTO value is 200 milliseconds. By contrast, a previous generation of SUN operating systems (Sun OS) employed a default initial RTT value of 1,500 milliseconds. Thus, when Solaris 2.5 is used in web server applications, its RTT default values lead to excessive gratuitous retransmissions for web traffic from remote browsers with lower speed network access.

There is a natural variance in RTT based on the serialization time of a maximum size segment PCP data packet, especially at the start of a transmission. As a transmission window opens, the time for the acknowledgment of a data packet must incorporate the serialization time of the preceding packet as well as its own.

One technique for dealing with such a problem is to set a large default value for RTO. But this is inefficient when used over high speed serial lines (for example, T1) because timeout detection is delayed. For example, if an RTT is 200 milliseconds, it is inefficient to establish a minimum value RTO of 2,000 milliseconds because it will take on the order of ten times the RTT for an RTO to occur. However, if the default parameters for RTO are set too low, then gratuitous retransmission occurs on virtually every low speed connection.

In a copending U.S. patent application Ser. No. 08/742, 994, now pending, in the name of Robert L. Packer, entitled "Method for Explicit Data Rate Control in a Packet Communication Environment Without Data Rate Supervision," a technique for automatically scheduling TCP packets for transmission is disclosed. Furthermore, in a copending U.S. patent application Ser. No. 08/762,828, now U.S. Pat. No. 5,802,106, in the name of Robert L. Packer, entitled "Method for Rapid Data Rate Detection in a Packet Communication Environment Without Data Rate Supervision," a technique for automatically determining the data rate of a TCP connection is disclosed. While these patent applications teach methods for solving problems associated with scheduling transmissions and for automatically determining a data flow rate on a TCP connection, respectively, there is no teaching in the prior art of methods for explicitly managing retransmissions of TCP packets based upon a minimum timeout value.

What is needed is a method for managing retransmissions to minimize the number of gratuitous retransmissions that take place on TCP connection based upon automatically determined characteristics of the underlying network connection.

SUMMARY OF THE INVENTION

According to the invention, a method is provided for preventing gratuitous retransmission of data from being propagated through a network by holding data to be retransmitted for a minimum time period. If an acknowledgment occurs while the retransmitted data is still being held, then the retransmitted data is discarded rather than propagated through the network. The invention also provides for selectively holding retransmissions based upon ascertainable factors about the underlying connection activity, such as number of successful transmissions.

An advantage of systems incorporating methods provided by the present invention is minimizing of the gratuitous retransmission of information which otherwise would add to the network load at a point when the network is already critically loaded.

A further advantage of the present invention is automatic determination of when the retransmission clamp should be applied based upon automatic detection of parameters of the underlying network.

The invention will be better understood upon reference to the following detailed description and its accompanying drawings.

DETAILED DESCRIPTION OF THE SPECIFIC EMBODIMENTS

Hardware Overview

Figure 1A:
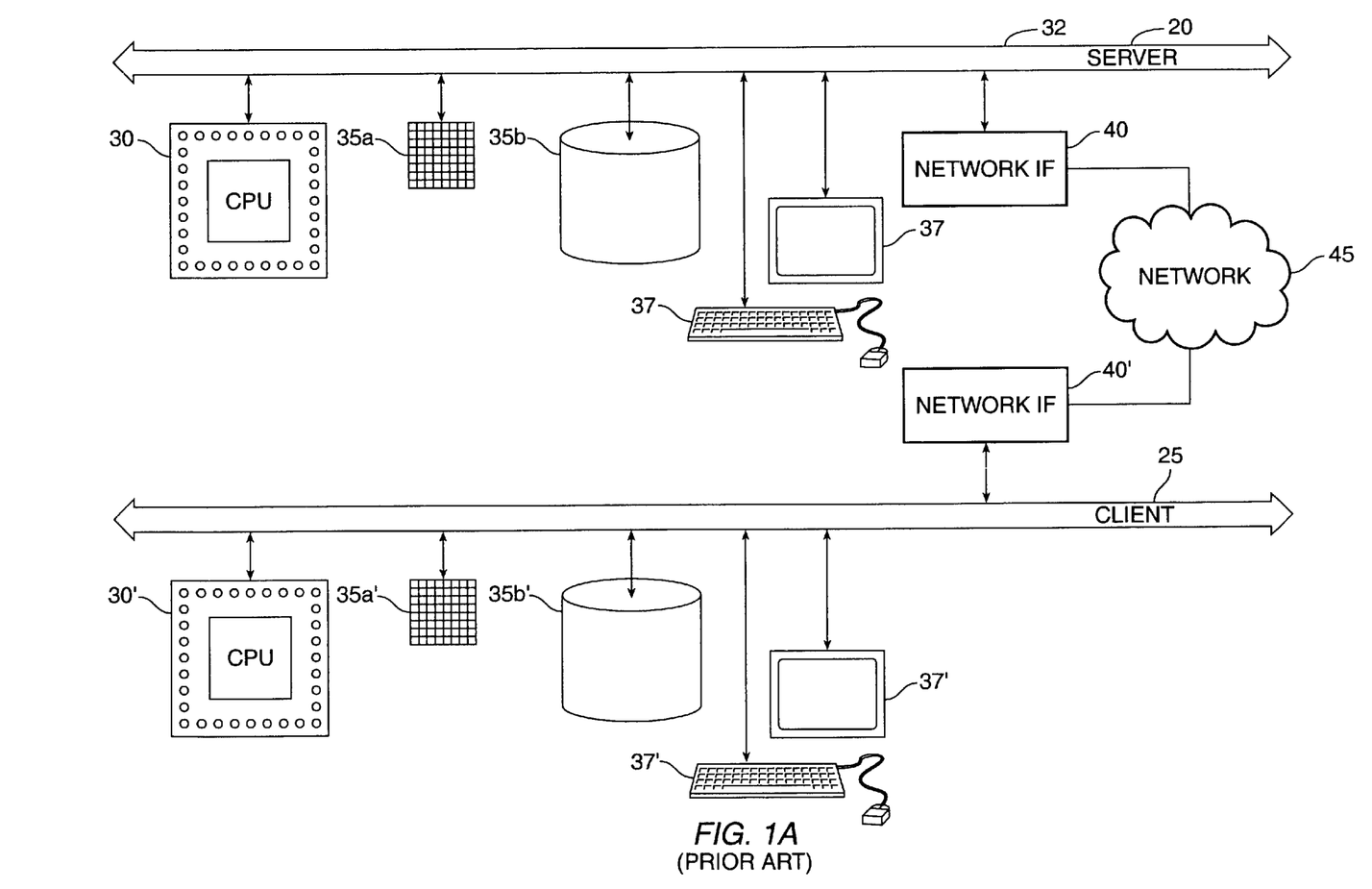
FIG. 1A depicts a representative client server relationship in accordance with a particular embodiment of the invention.

The method for managing retransmissions in a connectionless network environment of the present invention is implemented in the C programming language and is operational on a computer system such as shown in FIG. 1A. This invention may be implemented in a client-server environment, but a client-server environment is not essential. This figure shows a conventional client-server computer system which includes a server 20 and numerous clients, one of which is shown as client 25. The use of the term "server" is used in the context of the invention, wherein the server receives queries from (typically remote) clients, does substantially all the processing necessary to formulate responses to the queries, and provides these responses to the clients. However, server 20 may itself act in the capacity of a client when it accesses remote databases located at another node acting as a database server.

The hardware configurations are in general standard and will be described only briefly. In accordance with known practice, server 20 includes one or more processors 30 which communicate with a number of peripheral devices via a bus subsystem 32. These peripheral devices typically include a storage subsystem 35, comprised of a memory subsystem 35*a* and a file storage subsystem 35*b* holding computer programs (e.g., code or instructions) and data, a set of user interface input and output devices 37, and an interface to outside networks, which may employ Ethernet, Token Ring, ATM, IEEE 802.3, ITU X.25, Serial Link Internet Protocol (SLIP) or the public switched telephone network. This interface is shown schematically as a "Network Interface" block 40. It is coupled to corresponding interface devices in client computers via a network connection 45.

Client 25 has the same general configuration, although typically with less storage and processing capability. Thus, while the client computer could be a terminal or a low-end personal computer, the server computer is generally a high-end workstation or mainframe, such as a SUN SPARC server. Corresponding elements and subsystems in the client computer are shown with corresponding, but primed, reference numerals.

Bus subsystem 32 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

The user interacts with the system using interface devices 37' (or devices 37 in a standalone system). For example, client queries are entered via a keyboard, communicated to client processor 30', and thence to network interface 40' over bus subsystem 32'. The query is then communicated to server 20 via network connection 45. Similarly, results of the query are communicated from the server to the client via network connection 45 for output on one of devices 37' (say a display or a printer), or may be stored on storage subsystem 35'.

Figure 1B:
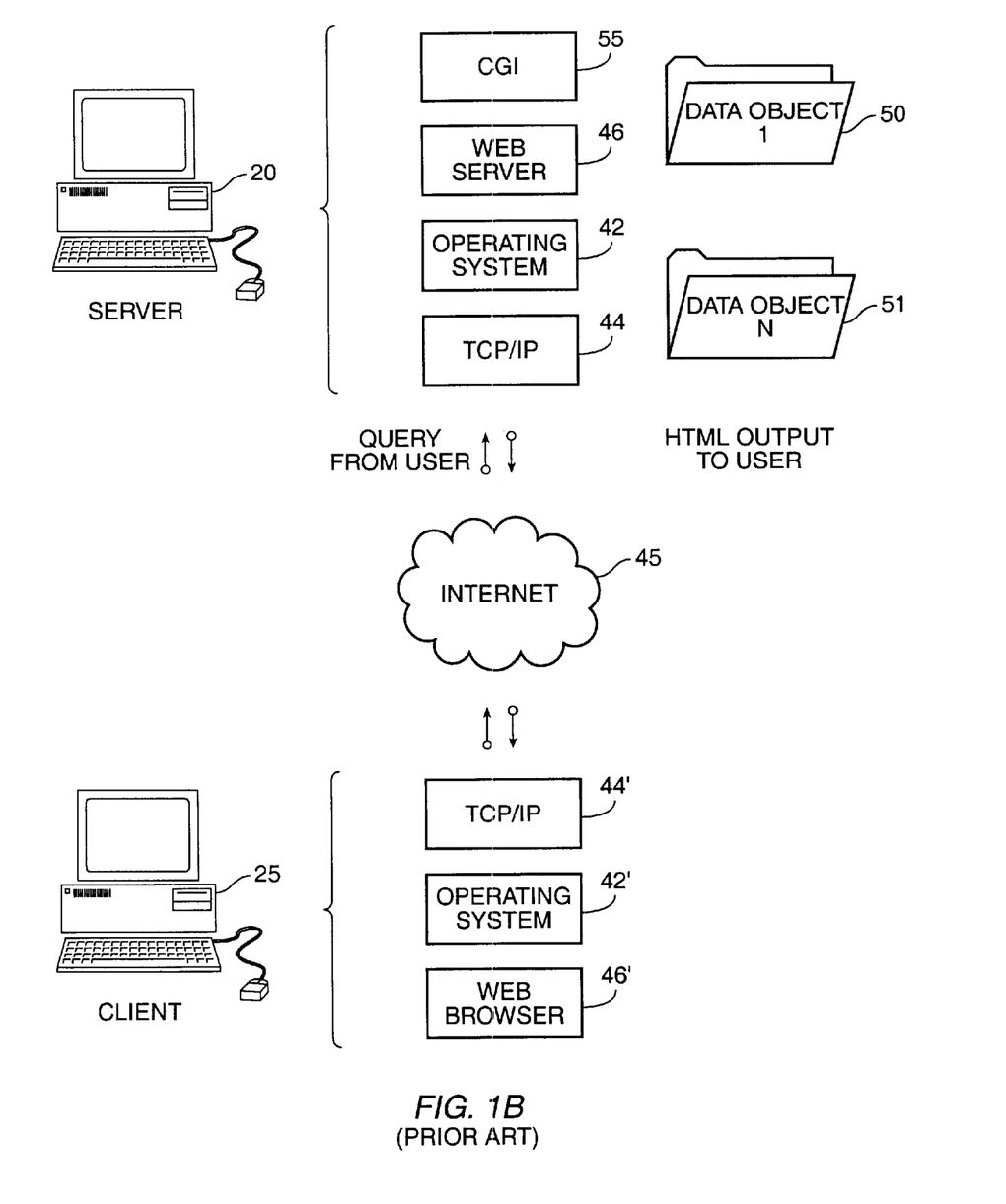
FIG. 1B depicts a functional perspective of the representative client server relationship in accordance with a particular embodiment of the invention.

FIG. 1B is a functional diagram of a computer system such as that of FIG. 1A. FIG. 1B depicts a server 20, and a representative client 25 of a plurality of clients which may interact with the server 20 via the Internet 45 or any other communications method. Blocks to the right of the server are indicative of the processing steps and functions which occur in the server's program and data storage indicated by blocks 35*a* and 35*b* in FIG. 1A. A TCP/IP "stack" 44 works in conjunction with Operating System 42 to communicate with processes over a network or serial connection attaching Server 20 to Internet 45. Web server software 46 executes concurrently and cooperatively with other processes in server 20 to make data objects 50 and 51 available to requesting clients. A Common Gateway Interface (CGI) script 55 enables information from user clients to be acted upon by web server 46, or other processes within server 20. Responses to client queries may be returned to the clients in the form of a Hypertext Markup Language (HTML) document outputs which are then communicated via Internet 45 back to the user.

Client 25 in FIG. 1B possesses software implementing functional processes operatively disposed in its program and data storage as indicated by block 35*a*' in FIG. 1A. TCP/IP stack 44', works in conjunction with Operating System 42' to communicate with processes over a network or serial connection attaching Client 25 to Internet 45. Software implementing the function of a web browser 46' executes concurrently and cooperatively with other processes in client 25 to make requests of server 20 for data objects 50 and 51. The user of the client may interact via the web browser 46' to make such queries of the server 20 via Internet 45 and to view responses from the server 20 via Internet 45 on the web browser 46'.

Network Overview

Figure 1C:
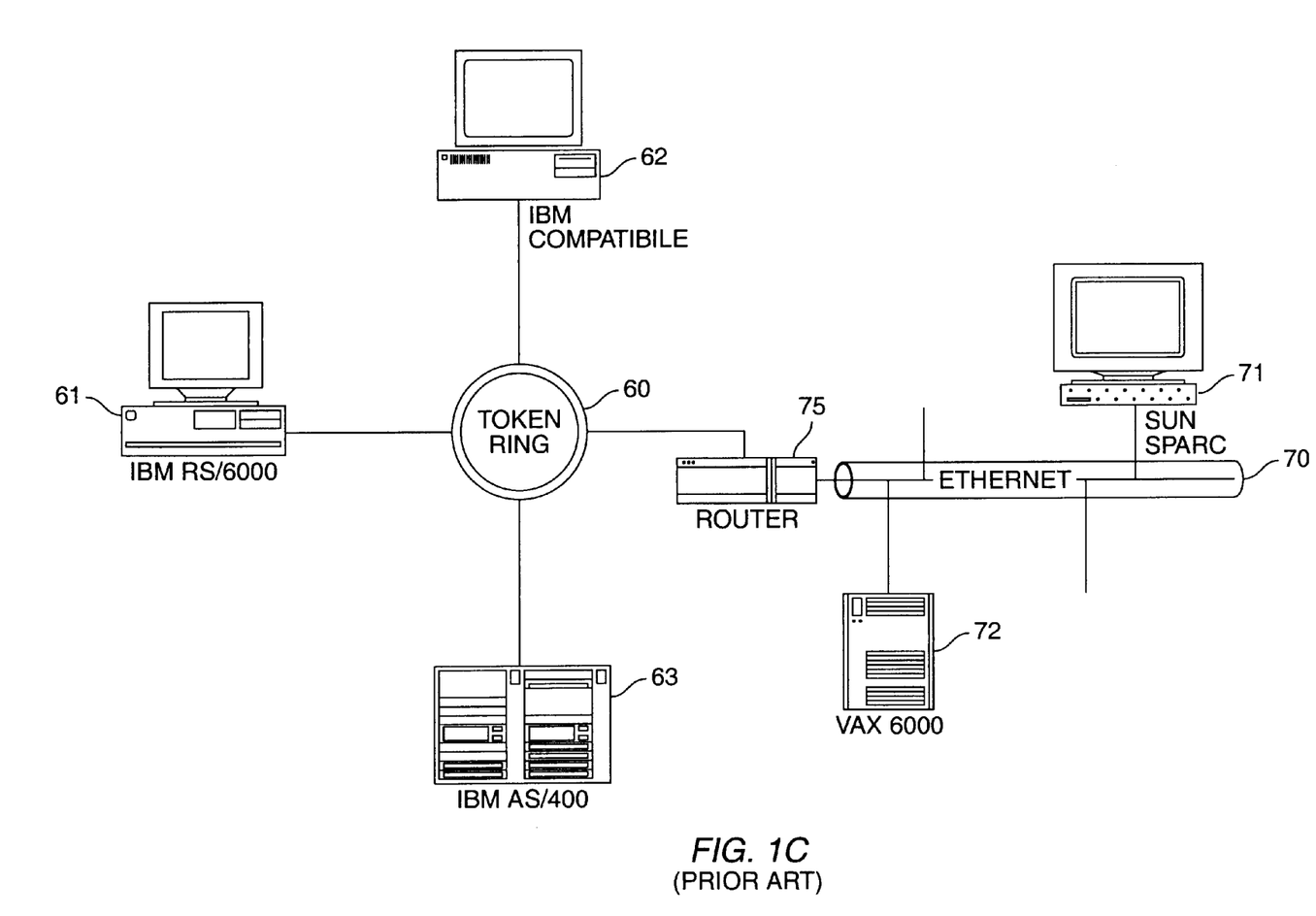
FIG. 1C depicts a representative internetworking environment in accordance with a particular embodiment of the invention.

FIG. 1C is illustrative of the internetworking of a plurality of clients such as client 25 of FIGS. 1A and 1B and a plurality of servers such as server 20 of FIGS. 1A and 1B as described herein above. In FIG. 1C, network 70 is an example of a Token Ring or frame oriented network. Network 70 links host 71, such as an IBM RS6000 RISC workstation, which may be running the AIX operating system, to host 72, which is a personal computer, which may be running Windows 95, IBM OS/2 or a DOS operating system, and host 73, which may be an IBM AS/400 computer, which may be running the OS/400 operating system. Network 70 is internetworked to network 60 via a system gateway which is depicted here as router 75, but which may also be a gateway having a firewall or a network bridge. Network 60 is an example of an Ethernet network that interconnects host 61, which is a SPARC workstation, which may be running SUNOS operating system with host 62, which may be a Digital Equipment VAX6000 computer which may be running the VMS operating system.

Router 75 is a network access point (NAP) of network 70 and network 60. Router 75 employs a Token Ring adapter and Ethernet adapter. This enables router 75 to interface with the two heterogeneous networks. Router 75 is also aware of the Inter-network Protocols, such as ICMP ARP and RIP, which are described herein below.

Figure 1D:
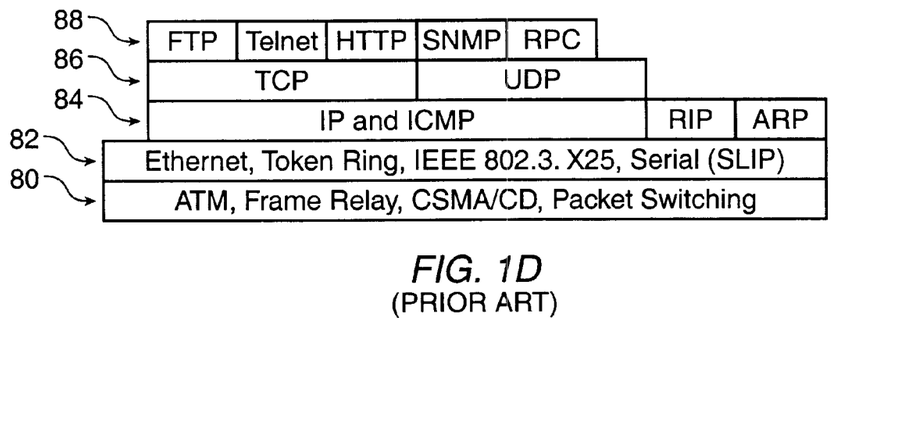
FIG. 1D depicts a relationship diagram of the layers of the TCP/IP protocol suite.

FIG. 1D is illustrative of the constituents of the Transmission Control Protocol/Internet Protocol (TCP/IP) protocol suite. The base layer of the TCP/IP protocol suite is the physical layer 80, which defines the mechanical, electrical, functional and procedural standards for the physical transmission of data over communications media, such as, for example, the network connection 45 of FIG. 1A. The physical layer may comprise electrical, mechanical or functional standards such as whether a network is packet switching or frame-switching; or whether a network is based on a Carrier Sense Multiple Access/Collision Detection (CSMA/CD) or a frame relay paradigm.

Overlying the physical layer is the data link layer 82. The data link layer provides the function and protocols to transfer data between network resources and to detect errors that may occur at the physical layer. Operating modes at the datalink layer comprise such standardized network topologies as IEEE 802.3 Ethernet, IEEE 802.5 Token Ring, ITU X.25, or serial (SLIP) protocols.

Network layer protocols 84 overlay the datalink layer and provide the means for establishing connections between networks. The standards of network layer protocols provide operational control procedures for internetworking communications and routing information through multiple heterogenous networks. Examples of network layer protocols are the Internet Protocol (IP) and the Internet Control Message Protocol (ICMP). The Address Resolution Protocol (ARP) is used to correlate an Internet address and a Media Access Address (MAC) for a particular host. The Routing Information Protocol (RIP) is a dynamic routing protocol for passing routing information between hosts on networks. The Internet Control Message Protocol (ICMP) is an internal protocol for passing control messages between hosts on various networks. ICMP messages provide feedback about events in the network environment or can help determine if a path exists to a particular host in the network environment. The latter is called a "Ping". The Internet Protocol (IP) provides the basic mechanism for routing packets of information in the Internet. IP is a non-reliable communication protocol. It provides a "best efforts" delivery service and does not commit network resources to a particular transaction, nor does it perform retransmissions or give acknowledgments.

The transport layer protocols 86 provide end-to-end transport services across multiple heterogenous networks. The User Datagram Protocol (UDP) provides a connectionless, datagram oriented service which provides a non-reliable delivery mechanism for streams of information. The Transmission Control Protocol (TCP) provides a reliable session-based service for delivery of sequenced packets of information across the Internet. TCP provides a connection oriented reliable mechanism for information delivery.

The session, or application layer 88 provides a list of network applications and utilities, a few of which are illustrated here. For example, File Transfer Protocol (FTP) is a standard TCP/IP protocol for transferring files from one machine to another. FTP clients establish sessions through TCP connections with FTP servers in order to obtain files. Telnet is a standard TCP/IP protocol for remote terminal connection. A Telnet client acts as a terminal emulator and establishes a connection using TCP as the transport mechanism with a Telnet server. The Simple Network Management Protocol (SNMP) is a standard for managing TCP/IP networks. SNMP tasks, called "agents", monitor network status parameters and transmit these status parameters to SNMP tasks called "managers." Managers track the status of associated networks. A Remote Procedure Call (RPC) is a programming interface which enables programs to invoke remote functions on server machines. The Hypertext Transfer Protocol (HTTP) facilitates the transfer of data objects across networks via a system of uniform resource indicators (URI).

Clamping Premature Retransmissions

Figure 2A:
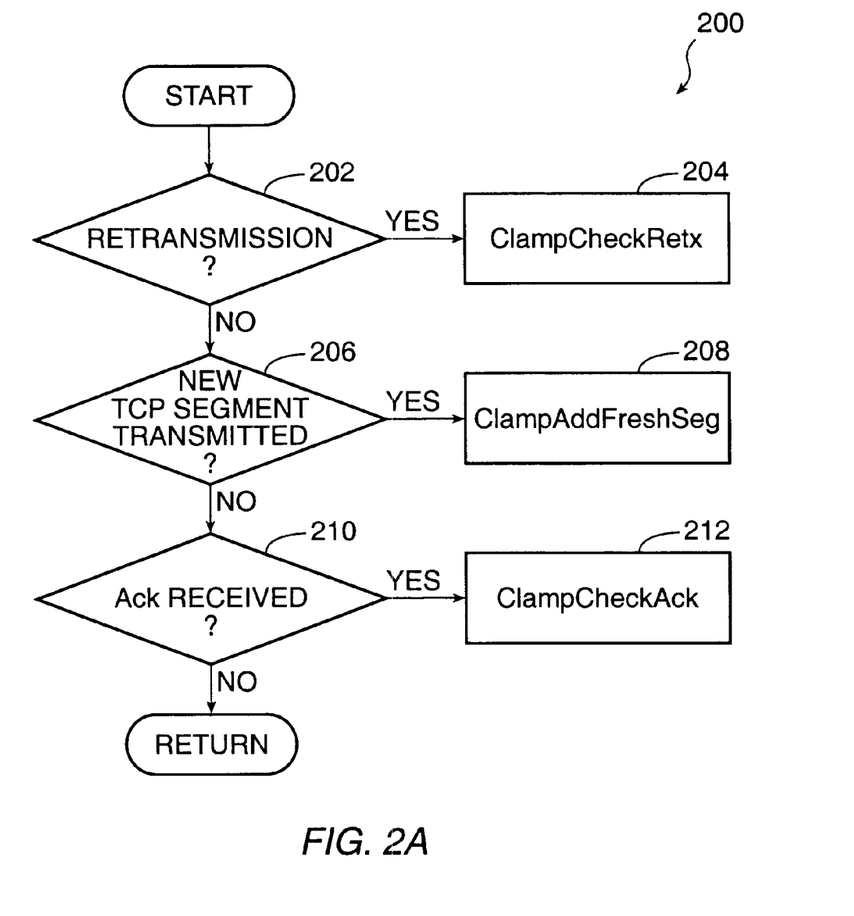
FIGS. 2A–2D depict flow chart representations of the process steps in clamping retransmissions in accordance with a specific embodiment of the invention.

FIG. 2A depicts a flowchart 200 of the process steps performed in accordance with a particular embodiment of the invention. Depending upon the embodiment, processing of the decisional steps of flowchart 200 need not be performed in a single process, nor in the precise order depicted. Decisional step 202 determines if a retransmission is occurring for a particular TCP conversation. If retransmission is occurring, process step 204 performs the processing depicted in flowchart 201 of FIG. 2B to check for the existence of clamps on the retransmission, and if one is found, to schedule the retransmission to occur after the clamp time has expired. Decisional step 206 checks if a new segment of TCP data is being transmitted for a particular TCP conversation. If a new segment is being transmitted, process step 208 performs the processing depicted in flowchart 203 of FIG. 2C to determine whether conditions are favorable for removing a clamp for the transmission of data on this particular TCP conversation. Decisional step 210 determines whether an acknowledgment has been received on a particular TCP conversation. If an acknowledgment is received, process step 212 performs the processing depicted in flowchart 205 of FIG. 2D to determine if there are retransmissions being clamped, and if so, it aborts that retransmission.

Figure 2B:
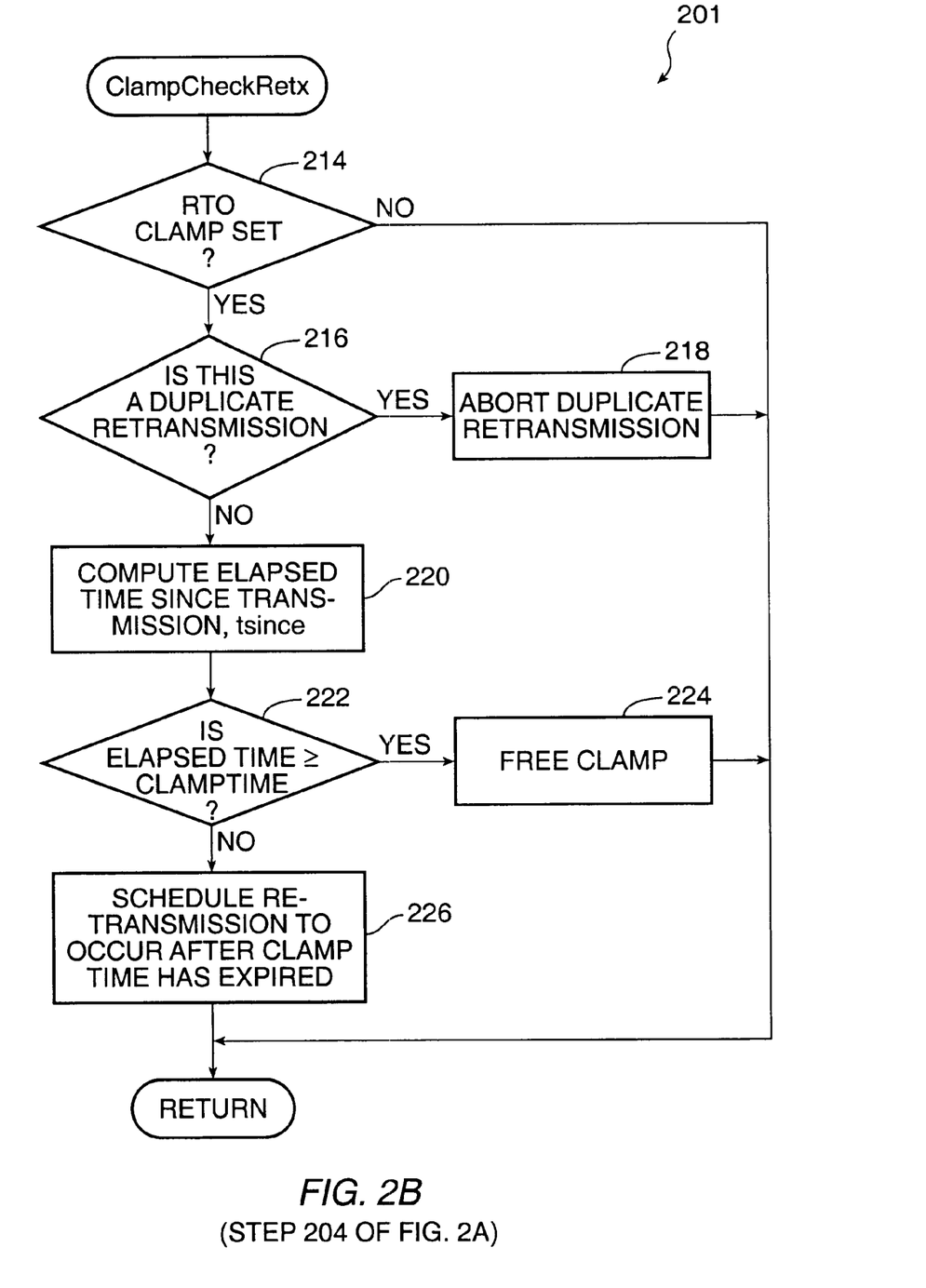

FIG. 2B depicts a flowchart 201 of the process steps comprising step 204 of FIG. 2A which perform the function of determining whether a particular retransmission should be clamped. In decisional step 214 of flowchart 201, a check is performed to see if any clamps are set. If no clamps are set, the routine will simply return. However, if a clamp is set, processing continues with decisional step 216, which checks if the scheduled retransmission is a duplicate retransmission. If a duplicate retransmission is detected, then in processing step 218 the duplicate retransmission is aborted and the procedure returns. Otherwise, in processing step 220, a computation of the elapsed time since the transmission, tsince, is performed. Next in decisional step 222, the elapsed time computed is compared with the clamp time. If the elapsed time since that transmission is larger than the clamp time, then in step 224, the clamp is freed and the procedure returns. Otherwise, if the elapsed time since transmission is not greater than or equal to the clamp time, then in step 226, the retransmission is rescheduled to occur after the clamp time has expired and the routine returns. Rescheduling TCP transmissions is a process known in the art and is more fully described in U.S. patent application Ser. No. 08/742,994, Robert L. Packer, entitled "Method for Explicit Data Rate Control in a Packet Communication Environment Without a Data Rate Supervision," and is incorporated herein by reference for all purposes. The retransmission is "clamped" to the clamp time. These processing steps are depicted in greater detail by the pseudocode for procedure, clampCheckRetx, in lines (3) herein below.

```
/************************************************************
**
*
* clampCheckRetx(tcb, bcb, tcpHdr)                    (3)
*
* Called for each detected RETRANSMITTED segment.
************************************************************
**
*/
int
clampCheckRetx(TCB *tcb, BCB *bcb TCP_HDR *tcpHdr)
{
    HALF_CONN_INFO *hci;
    RTO_CLAMP*clamp;
    int tsince, i;
    SEG_EVENT*se;
    SEQ seq = tcpHdr->seq + (SEQ)(tcpHdr->dataLen);
    rtoMibOutboundRetxSegs++;
    if(! TcpClampRto) return(FALSE);
    hci = &tcb->halfConns[bcb->fspec.direction];
    if((clamp = hci->clamp) == NULL) return(FALSE);
    for(i = 0; i < NUM_SEG_EVENTS; i++) {
        se = &clamp->segEvents[i];
        if(se->seq != seq) continue;
        /*
         * Could be a duplicate retx while we are still delaying
         * the first retx . . .
         */
        if (se->delayedRetx != NULL) {
            info3("tossing DUP tcb %1x bcb %1x seq %1x", clamp->tcb,
                bcb, seq);
            clampTossBcb(clamp, bcb, seq, FALSE);
            return(TRUE);
        }
        tsince = TIME_SINCE(se->time);
        /*
         * Is it an acceptable RTQ . . .
         */
        clamp->consecutiveFreshSegs = 0;
        if(tsince >= gclampTime) {
            se->seq = 0;
            blurt3("NOT delaying tcb %1x bcb %1x seq %1x", clamp->tcb,
                bcb, seq);
            if(clamp->delays = 0) clampFree(clamp);
            return(FALSE);
        }
        /*
         * Schedule the retx to be transmitted after at least
         * the specified period has elapsed since the last fresh
         * segment . . .
         */
        info3("delaying tcb %1x bcb %1x seq %1x", clamp->tcb, bcb3 seq);
        clamp#>delays++;
        se->delayedRetx = bcb;
        bcb->tick.msecs = sysTimeStamp() + (gClampTime - tsince);
        /*
         * The RECYCLE routine is a callback which is invoked
         * after the packet is transmitted . . .
         */
```

```
        bfpushRecycle(bcb, clampExpired, (void*)tcb);
        pktTxScheduled(OTHER_IFACE(bcb->device), bcb);
        return(TRUE);
    }
    return(FALSE);
}
```

Figure 2C:
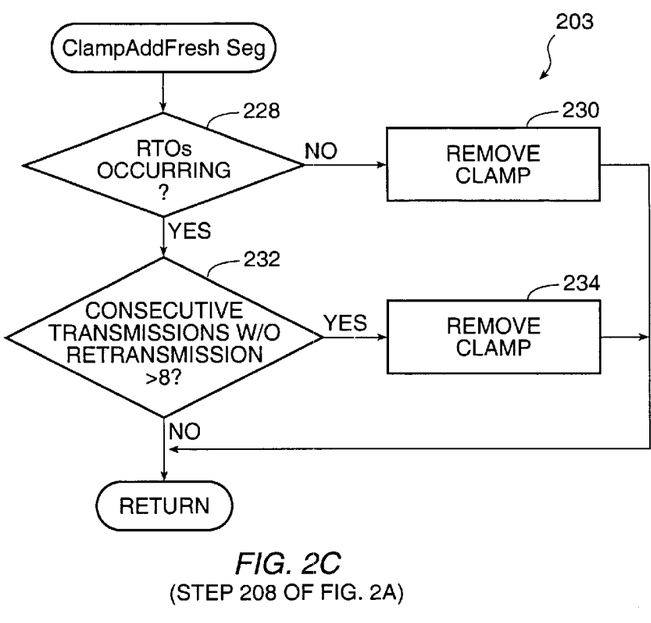

FIG. 2C depicts a flowchart 203 which depicts the process steps comprising step 208 of FIG. 2A, which are performed whenever new TCP data is transmitted. According to a particular embodiment of the invention, new TCP conversations begin with clamps in place for retransmissions. Hence, processing according to step 208 of FIG. 2A as more fully depicted by FIG. 2C determines whether conditions are favorable for removing the clamp. In decisional step 228, a check is performed to see if RTOs are occurring. If RTO timeouts are not occurring for this particular TCP conversation, then in step 230, the clamp for this connection is removed, and the procedure returns. Otherwise, decisional step 232 checks if eight consecutive transmissions have occurred without a retransmission. If eight consecutive transmissions have occurred without a retransmission on this TCP conversation, then in step 234, the clamp for this TCP conversation is removed. Otherwise, or in any event, the procedure returns. This processing is further depicted by the pseudocode for routine clampAddFreshSeg, in lines (4) herein below.

```
/************************************************************
**
*
* clampAddFreshSeg(clamp, bcb, seq)                   (4)
*
* Called for every FRESH (non-retransmitted) segment processed.
************************************************************
**
*/
void
clampAddFreshSeg(RTO_CLAMP *clamp, BCB *bcb, SEQ seq)
{
    SEG_EVENT *se;
    se = &clamp->segEvents[COUNT_TO_SEG_EVENT(clamp->
        segCounter)];
    if(++clamp->segCounter > CLAMP_SEG_THRESH &&
        clamp->delays == 0) {
        clampFree(clamp);
        return;
    }
    if(se->delayedRetx != NULL) {
        attn2("NO room - tcb %1x seq %1x", clamp->tcb, seq);
        return;
    }
    if(++clamp->consecutiveFreshSegs >
            CLAMP_FRESH_SEG_THRESH) {
        clampFree(clamp);
        return;
    }
    se_>seq = seq;
    se->time = sysTimeStamp();
    blurt2("tcb %1x seq %1x", clamp->tcb, seq);
}
```

Figure 2D:
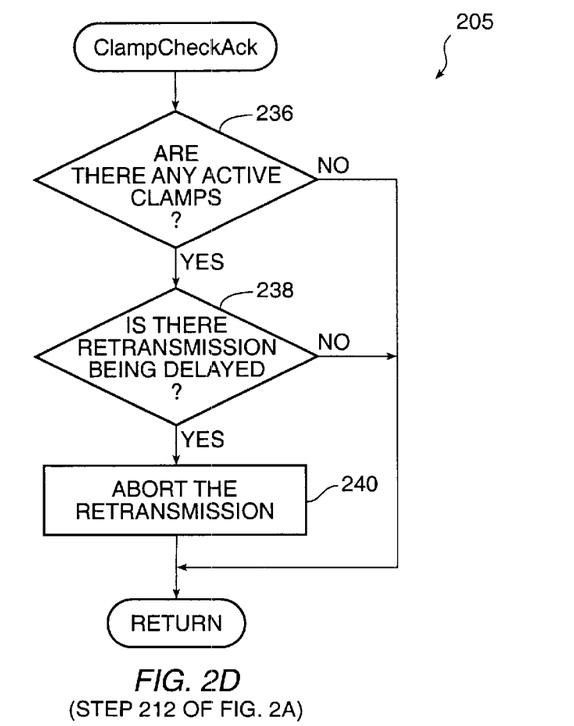

FIG. 2D depicts flowchart 205 which depicts the process steps comprising step 212 of FIG. 2A, which are performed whenever the system receives an acknowledgment or "ACK" for a particular TCP conversation. Decisional step 236 checks if there are active clamps for this conversation. If no active clamps are detected, then the procedure returns. Otherwise, decisional step 238 checks if a retransmission is being clamped. If there are no retransmissions being clamped, then the procedure simply returns. Otherwise, in step 240, the retransmission is aborted, the data to be retransmitted is discarded, and the procedure returns. This processing is depicted in further detail by the pseudocode for routine clampCheckAck, in lines (5) herein below.

```
/***************************************************************
**
*
* clampCheckAck(clamp, direction, ack)                    (5)
*
* Called for each FRESH ACK received.
* See if we are delaying an RTO that actually got acked . . .
***************************************************************
**
*/
void
clampCheckAck(RTO_CLAMP *clamp, int direction, SEQ ack)
{
  int i;
  SEG_EVENT *se;
  BCB *bcb;
  if(clamp == NULL) return;
  for(i=0; i < NUM_SEG_EVENTS; i++) {
    se = &clamp->segEvents[i];
    if(se->seq == 0) continue;
    if(SE_LT(ack, se->seq)) continue;
    /*
    * Make sure we only do this once per seq . . .
    */
    se_->seq = 0;
    if((bcb = se->delayedRetx) == NULL) continue;
    se->delayedRetx = NULL;
    /*
    * OK - we got one . . .
    */
    clampTossBcb(clamp, bcb, ack, TRUE);
  }
}
```

TCP Data Link Rate and Latency Period Determination

In accordance with a particular embodiment of the present invention, the initial default minimum timeout value, or clamp, may be determined automatically from the underlying network using the techniques for automatically determining data rates, as are known in the art, and are more fully set forth in co-owned, copending U.S. patent application Ser. No. 08/762,828, now U.S. Pat. No. 5,802,106, in the name of Robert L. Packer, entitled "Method for Rapid Data Rate Detection in a Packet Communication Environment Without Data Rate Supervision," which is incorporated herein by reference for all purposes.

Figure 3:
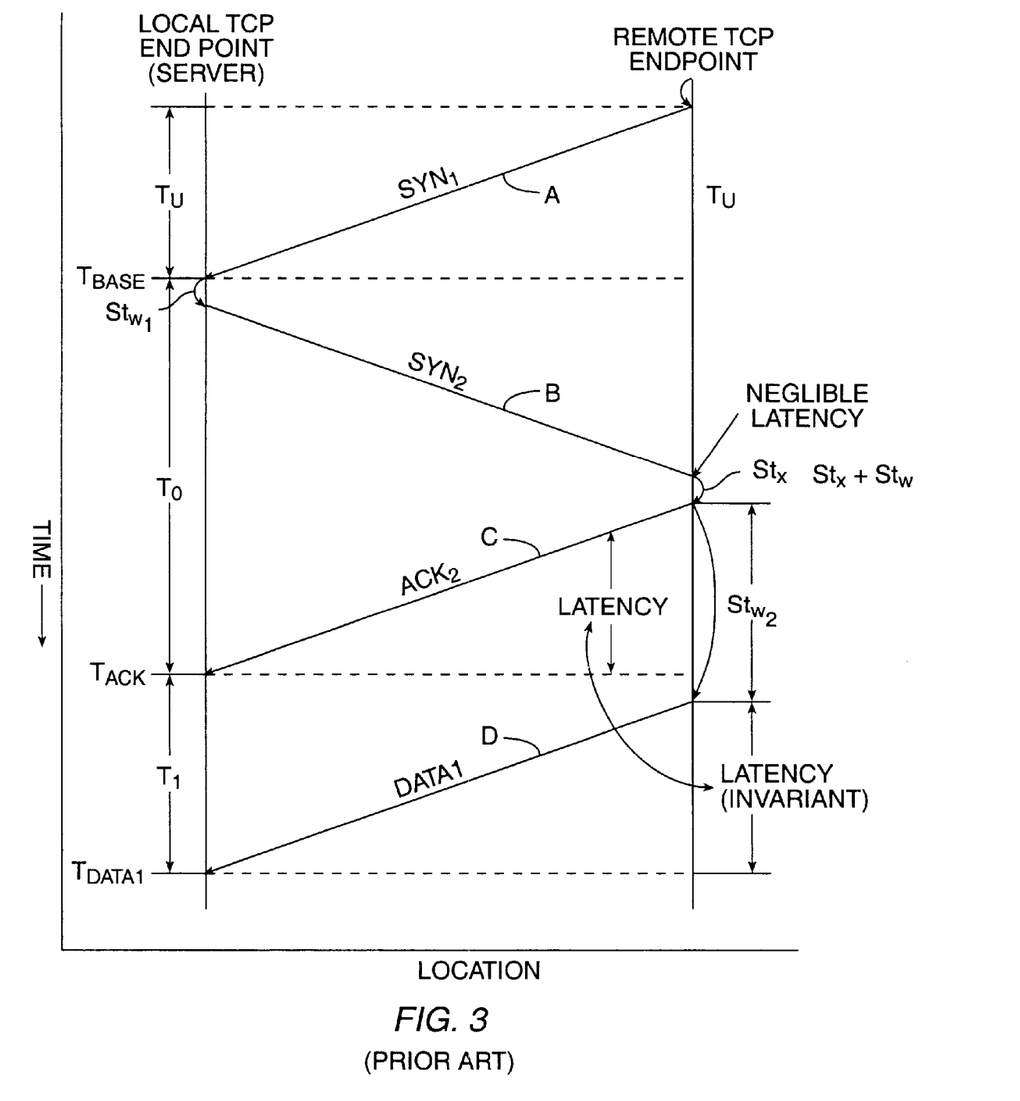
FIG. 3 depicts a two dimensional representation of timing relationships in the exchange of packets between hosts using the TCP protocol.

FIG. 3 depicts a two-dimensional timing diagram illustrative of one particular method for determining a data link rate and latency period from an exchange of packets between TCP endpoints. According to this method, the initial data packets are examined as they establish a connection. Parameters are developed from which round trip time (RTT) and maximum data rate can be determined. The serialization speed (SS) or data flow rate capacity of a link is given by the relation:

$$SS = m/T_1 \quad (6)$$

where:

m=number of bytes in the first data packet (Data1)

$T_1$=The arrival time of the first data packet less the time of arrival of the ACK packet ($T_{data1} - T_{ACK}$)

FIG. 3 shows a two dimensional timing diagram of the connection protocol of a remote HTTP request between a local TCP endpoint (server) and a remote TCP endpoint (client). The remote endpoint issues a request for connection in the form of a SYN packet in step A. The SYN packet takes a finite but unknown transit time to arrive at the local TCP endpoint. The local TCP endpoint responds by sending its own SYN packet in step B. This SYN packet is of a known byte length and is issued at a known time, which becomes the reference time, "tbase." After a brief latency, the remote TCP endpoint issues a standard ACK packet, whose length is likewise known, in step C, and then also issues the first data packet data1 in step D.

Time $T_1$ is computed immediately at the time of arrival of data1 by examining the difference in arrival time of the received ACK packet and the data1 packet. The value of m is extracted by examining the entire first packet to determine its length or by examining the packet length field, if any, in the header information of the packet. A first estimate of serialization speed SS is given by Equation (6). Serialization speed can be estimated immediately upon interchange of the first packets and used to make important strategic decisions about the nature and speed of the connection about to be established.

An alternative method for determining a data link rate and latency period from an exchange of packets between TCP endpoints develops parameters from which round trip time (RTT) and maximum data rate can be determined. Values are obtained for serialization of n, the size (i.e., data length) of the SYN packet in response, plus the size (i.e., data length) of the ACK packet. Serialization time is determined according to Equation (7) by dividing the value n by the transit time $T_0$, or $$SS(\text{max possible}) = n/T_0 \quad (7)$$

where n=number of bytes in the SYN packet plus the number of bytes in the ACK packet and $T_0$=the arrival time of the ACK packet less the tbase value.

The round trip time minus the serialization time is the round trip latency $T_d$.

Clamping Based upon a Computed Round Trip Time Out (RTO)

In accordance with a particular embodiment of the invention, values for RTO are re-computed periodically from latency data and made available to the clamping process depicted in FIGS. 2A, 2B, 2C and 2D as default values for the minimum timeout or clamp. In a particular embodiment, RTT may be estimated by the connection latency, $T_1$. A useful value for RTO can be computed on these values using any of a number of techniques as are well known in the art.

In a related embodiment, RTT may be estimated by the round trip latency, $T_d$, and a value for RTO may computed on this value as described above.

The following pseudocode depicts related procedures invoked by the procedures described herein above according to a particular embodiment of the invention.

```
/************************************************************
**
*
*
* description: TCP Premature RTO Clamping PseudoCode.
*
*    Clamping is disabled if:
*    If flow doesn't retx within first N packets.
*
*    If an RTO of greater that the threshhold is detected.
*
*    If we have forwarded N consecutive packets without retx.
*
*************************************************************
**
*/
BCB - Buffer Control Block. Points to packet.
TCB - Transport Control Block. TCP state info.
/*
* All retransmissions occurring before this interval will be deferred
* until at least this interval has elapsed . . .
#define RTO_CLAMP_TIME                          1600L
INT32 gClampTime = RTO_CLAMP_TIME;
/*
* Number of undelayed packets after which we will stop clamping.
*/
#define CLAMP_SEG_THRESH                        8
/*
* Number of packets without retx after which we will stop clamping.
*/
#define CLAMP_FRESH_SEG_THRESH                  8
/*
* Seg events must be a power of 2 . . .
*/
#define NUM_SEG_EVENTS                          8
#define COUNT_TO_SEG_EVENT(x)       ((x) & (NUM_SEG_EVENTS-1))
typedef struct {
   SEQ     seq;
   TIME    time;
   BCB     *delayedRetx;
} SEG_EVENT;
struct_rto_clamp {
   struct_rto_clamp *next;
   INT16       segCounter;
   INT16       consecutiveFreshSegs;
   INT16       delays;
   INT16       tosses;
   TCB         *tcb;
   SEG_EVENT segEvents[NUM_SEG_EVENTS];
};
void
clampTossBcb(RTO_CLAMP *clamp, BCB *bcb, SEQ ack, int scheduled)
{
   recycle buffer (bcb) and increment stats
}
/************************************************************
**
*
* clampExpired(bcb, tcb)
*
* Recycle routine - ACK not heard in extended wait and pkt was sent.
*************************************************************
**
*/
void
clampExpired(BCB *bcb, TCB *tcb)
{
   RTO_CLAMP *clamp = tcb->halfConns[bcb->fspec.direction].clamp;
   int i;
   SEG_EVENT *se;
   /*
   * Need to verify clamp/tcb to do anything here . . .
   */
   if(clamp->tcb && clamp->tcb == tcb) {
      /*
      * If we are not tossing, this retx was OK - infer it is time
      * to stop clamping...
      */
      if(clamp->tosses !=0) {
         for(i=0; i < NUM_SEG_EVENTS; i++){
```

```
        se = &clamp->segEvents[i];
    /*
    * Get rid of it . . .
    */
        if(se->delayedRetx == bcb){
            se->delayedRetx = 0;
            se_>seq = 0;
            bfRecycle(bcb);
            return;
        }
      }
    }
    /*
    * Not found . . .
    */
    clampFree(clamp);
  }
  /*
  * Free the buffer . . .
  */
  bfRecycle(bcb);
}
```

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A method for minimizing retransmission of data on a transmission link in a digital data packet communication environment having a plurality of digital packet transmission stations interconnectable in arbitrary and changeable data paths, wherein said data packet communication environment lacks explicit end-to-end data rate control, said method comprising the steps of:

detecting retransmission of data at a point intermediate of said endpoints; upon said detecting clamping said retransmission of data to a clamp time, said clamp time being measured from a prerecorded time of original transmission of said data;

for said transmission of data, determining an elapsed time since said transmission; and permitting said retransmission of data through said intermediate point whenever said elapsed time exceeds said clamp time without receipt of an acknowledgment.

2. The method of claim 1 further comprising the step of:
discarding said retransmission if said acknowledgment is received.

3. The method of claim 1 further comprising the step of:
removing a clamp of said retransmission of data whenever a number of consecutive transmissions without a timeout has occurred.

4. The method of claim 1 wherein said digital data packet communication environment is a Transmission Control Protocol (TCP) connection.

5. The method of claim 1 wherein said digital data packet communication environment is a User Datagram Protocol (UDP) session.

6. A method for preventing gratuitous retransmission of data from being propagated through a transmission link in a digital data packet communication environment having a plurality of digital packet transmission stations interconnectable in arbitrary and changeable data paths, wherein said data packet communication environment lacks explicit end-to-end data rate control, said method comprising the steps of;

detecting retransmission of data at a point intermediate of said endpoints; upon said detecting clamping data to be retransmitted for a minimum time period at a point intermediate of endpoints, said time period being measured from a prerecorded time of original transmission of said data;

waiting for an acknowledgment to occur while the retransmitted data is clamped;

discarding the data to be retransmitted if the acknowledgment occurs;

propagating the data to be retransmitted through the network via said intermediate point if the acknowledgment does not occur.

7. The method of claim 6 further comprising the step of:
selectively clamping the data to be retransmitted based upon ascertainable factors about the underlying connection activity.

8. The method of claim 6 further comprising the step of:
determining said minimum amount of time based upon ascertainable factors about the underlying connection activity.

9. The method of claim 6 wherein said digital data packet communication environment is a Transmission Control Protocol (TCP) connection.

10. The method of claim 6 wherein said digital data packet communication environment is a User Datagram Protocol (UDP) session.

* * * * *